Feb. 9, 1937. H. R. WHITTIER 2,070,221
THERMOMETER
Filed Nov. 3, 1936
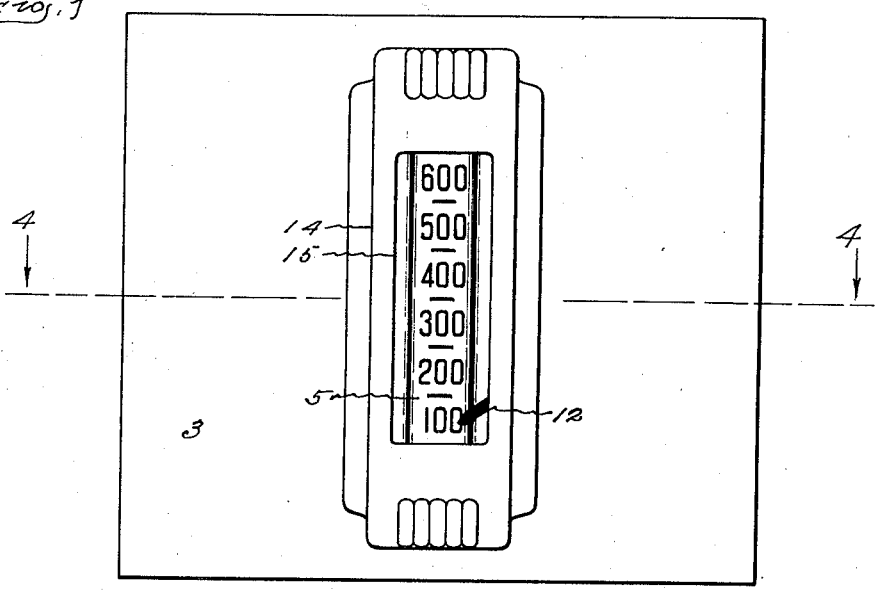
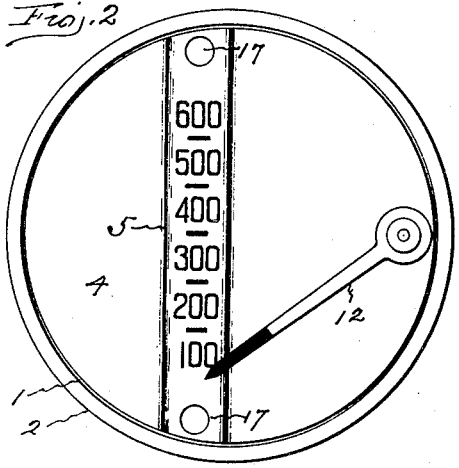
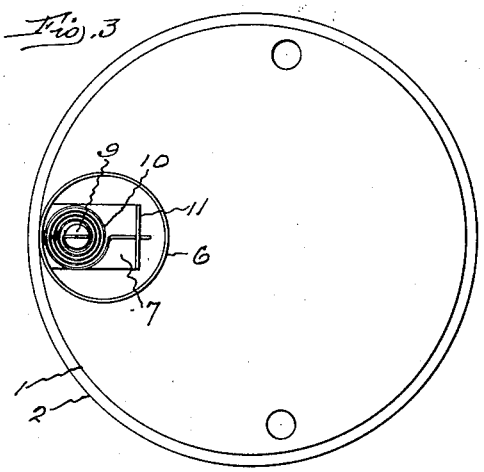
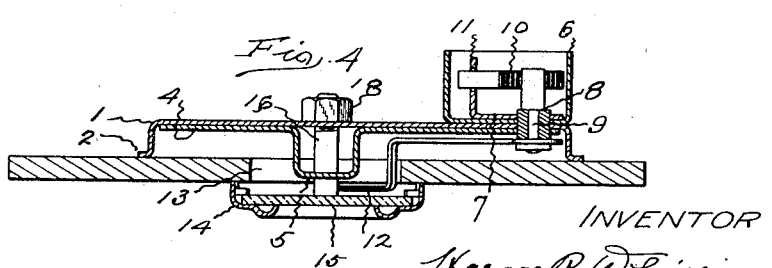
INVENTOR
Horace R. Whittier by
Harry P. Williams
Atty.

Patented Feb. 9, 1937

2,070,221

UNITED STATES PATENT OFFICE 2,070,221

THERMOMETER

Horace R. Whittier, Bristol, Conn., assignor to The Cooper Oven Thermometer Company, Plymouth, Conn., a corporation of Connecticut Application November 3, 1936, Serial No. 108,962

1 Claim. (Cl. 73—118)

This invention relates to thermometers of the mechanical class, that is, thermometers in which the temperature indicating means are actuated by a thermo-responsive metallic strip, and which are particularly designed for application to the doors or walls of stoves and range ovens that are heated by gas, coal, oil or electricity, but that are also capable of attachment to cooking utensils and other articles the temperature of which it is desirable to observe.

The object of the invention is to produce thermometers of the type mentioned which are composed of a minimum number of elements that are cheap to manufacture, assemble and apply for use, and that are ornamental and have the temperature indicating numerals arranged so that they may be conveniently read.

In the accompanying drawing Fig. 1 shows a front view of a thermometer which embodies the invention applied to an oven door panel.

Fig. 2 shows a front view of the thermometer with the panel and the cover removed.

Fig. 3 shows a back view of the thermometer.

Fig. 4 shows a section on the dotted line 4—4 on Fig. 1.

The back of the thermometer illustrated is a shallow circular cup 1 with an outward flange 2 around its rim, the flange being designed to fit against the inner surface of the panel 3 of the door or wall to which the thermometer is to be attached. Secured in the cup is a circular dial plate 4. Extending forwardly across the face of the dial plate so as to stand vertically when the thermometer is in use, is a raised strip 5. This strip is preferably struck up from the plate when the dial is stamped to shape, and on it are printed or stamped the numerals provided to indicate the temperatures to which the thermometer is subjected.

Secured to the back of the cup is a shell 6 in which is an angle plate 7. A tubular bushing 8 extends through the angle plate, shell, cup and dial plate. Passing through this bushing is a spindle 9. One end of a coil 10 of thermo-responsive metal is connected to the end of the spindle in the shell while the other end of this coil is passed through a slot in the outstanding portion 11 of the angle plate, so that expansion and contraction of the coil will cause rotation of the spindle. The thermo-responsive strip may, of course, be in some other shape than a helical coil. On the end of the spindle in front of the dial plate is a pointer 12 the free end of which is bent out so that it will oscillate over the figures on the raised portion of the dial plate as the temperature to which the coil is subjected varies.

The members described are placed against the back of the panel to which the thermometer is to be applied with the forwardly extending vertical strip of the dial projecting toward or into the opening 13 in the panel. On the front of the panel is placed an ornamental projecting cover 14 that has a window 15 through which the numerals on the raised portion of the dial and the position of the pointer in relation thereto may be observed. The window is desirably closed by glass or any other suitable transparent material. Projecting from the back of the cover are screws 16 located to pass through the holes 17 in the dial, through the opening in the panel and through the cup when the parts are set in place of use, and to receive nuts 18 on the interior, for securing the operative parts and the dial to the back of the panel, and the cover to the front.

The thermometer described has an oscillating pointer actuated by a simple thermo-responsive means and the temperatures read vertically as are the temperatures of the ordinary mercury thermometers with which the public are most familiar. The raised dial strip brings the numerals forward to a position where they may be clearly observed and but a small narrow section is required to be removed from the panel to receive the raised dial strip and the tip of the pointer.

The invention claimed is:

A thermometer comprising a cup, a dial fitted within the cup, said dial having a narrow integral raised section that projects forwardly out of the cup and extends vertically when the device is in use, numerals marked one above the other to read vertically on the raised section of the dial, a spindle rotarily supported by and extending through the bottom of the cup and dial, a thermo-responsive coil with one end connected to the end of the spindle in back of the bottom of the cup, a pointer attached to the end of the spindle in front of the dial, the end of the pointer extending in front of said numerals, a cover having a narrow vertical window shaped to expose said numerals and the tip of the pointer, and means extending rearwardly from the cover through the dial and bottom of the cup for securing the cover to the cup.

HORACE R. WHITTIER.